3,449,458
OXIDATIVE DEHYDROGENATION AND CRACKING IN MOLTEN BEDS
John Louis Tiedje, Israel Szabsaj Pasternak, and Noel John Gaspar, Sarnia, Ontario, Canada, assignors to Esso Research and Engineering Company, a corporation of Delaware
No Drawing. Filed Nov. 1, 1967, Ser. No. 679,647
Int. Cl. C07c 5/20
U.S. Cl. 260—669
31 Claims

ABSTRACT OF THE DISCLOSURE

Organic compounds are dehydrogenated, or dehydrogenated and cracked, by reaction with oxygen and hydrogen sulfide in a molten salt medium; the yield of light olefins from dehydrogenation and cracking can be increased by the addition of a hydrogen halide to the reaction mixture, olefins being useful in the synthesis of a wide variety of chemicals and polymers.

Field of invention

This invention relates to the preparation of unsaturated organic compounds. More particularly, this invention relates to a process for the dehydrogenation of organic compounds in a molten medium. Still more particularly, and in a preferred embodiment, this invention relates to a process for the dehydrogenation and cracking of hydrocarbons, e.g., hydrocarbons normally liquid at room temperature such as naphthas and gas oils, to produce high yields of light olefins, e.g., ethylene, which are useful in the synthesis of polymers and other valuable chemicals. Yet more particularly, the processes of this invention are conducted by contacting an organic feed with a molten salt medium in the presence of oxygen and hydrogen sulfide.

Prior art

Oxidative dehydrogenation is an attractive route for the preparation of unsaturated compounds from less unsaturated feeds. The reaction products are quite useful as monomers in polymerization reactions, e.g., ethylene, styrene, or as intermediates, e.g., ethylene as a precursor for vinyl chloride, for the preparation of valuable chemicals. The process is well known to the art and is the subject of various U.S. patents, e.g., 3,211,800 and 3,207,805, which disclose halogen-promoted reactions. Additionally, U.S. Patent 3,270,086 relates to oxidative dehydrogenation in a molten salt medium. Oxidative dehydrogenation is normally an exothermic reaction which requires careful temperature control. Thus, the prior art has disclosed several methods for controlling the heat liberated during the reaction: (1) use of low partial pressure for the feed; (2) use of fluidized catalyst beds; and (3) molten bed catalyst systems. While all of the above techniques have proved relatively successful, the use of molten media is particularly attractive due to the favorable heat exchange properties in molten beds. However, little investigation has been conducted in this area and reported results indicate relatively low yields of unsaturated compounds. By the practice of this invention, however, the yield of unsaturated products from dehydrogenation processes, i.e., products having the same number of carbon atoms as the feed, can be greatly enhanced by employing a sulfur promoter in a molten bed reaction.

Additionally, the process of the present invention may be utilized to effect the dehydrogenation and cracking, i.e., "dehydrocracking" of saturated feeds, resulting in exceedingly high yields of light olefins and/or aromatics. The obtention of light olefins from the cracking of paraffins is a well-known procedure and is normally carried out by thermal or catalytic cracking with or without the presence of steam. While these techniques are both sound and in wide use, the increased demand for light olefins, particularly ethylene and propylene, most particularly ethylene, has prompted serious investigation into increasing both the conversion of the feed and the selectivity to olefinic products. By the following of the process of this invention, however, conversions of saturated feeds in excess of 99% may be achieved with excellent selectivity to light olefins. This is to be contrasted with conventional steam pyrolysis reactions where conversions of only about 65% are normal.

Summary of the invention

Thus, in accordance with this invention, organic compounds are converted to more highly unsaturated compounds having the same number or a lesser number of carbon atoms than the feed by a process which comprises reacting the feed compounds with oxygen and hydrogen sulfide in a molten salt medium at temperatures ranging from about 900 to 1500° F. Thus, the process may be one basically of dehydrogenation wherein the products will generally have the same number of carbon atoms as the feed, or the process may also include cracking wherein the products will have the same or a lesser number of carbon atoms than the feed. Regardless, however, of the mechanism involved, the products of this invention will have a greater degree of unsaturation than the feeds. In another embodiment of this invention, the yield of olefins, particularly when cracking occurs, can be materially increased by the addition of a hydrogen halide to the reaction mixture.

While not wishing to be bound by any particular theory, it is believed that dehydrogenation occurs through the formation of an active sulfur species such as $S_2$, SH, or possibly $S_1$. The active species being obtained, for example, is in accordance with the following equation:

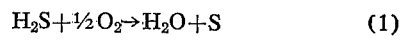
$$H_2S + \tfrac{1}{2} O_2 \rightarrow H_2O + S \qquad (1)$$

The reactive sulfur species forms in situ and thereafter reacts with the organic feed in accordance with Equation 2:

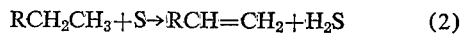
$$RCH_2CH_3 + S \rightarrow RCH=CH_2 + H_2S \qquad (2)$$

By employing the sulfur promoter in molten media reactions, conversions in excess of 90% may be obtained as compared with less than 10% in dehydrogenation processes conducted in molten media without the aid of a sulfur promoter.

As will be explained below, reaction conditions may be adjusted so that dehydrogenation is accompanied by cracking and relatively high yields of light olefins, i.e., $C_2$–$C_4$ olefins such as ethylene, propylene, butenes, butadiene, are produced. The relatively high yields of light olefins is believed to be due to the formation of only olefinic compounds from each mole of hydrocarbon that is cracked, whereas thermal cracking, for example, normally results in the formation of both paraffins and olefins for each mole of cracked hydrocarbon. This can be shown by the following example which illustrates thermal cracking of a paraffin:

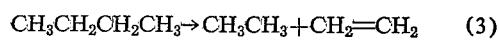
$$CH_3CH_2CH_2CH_3 \rightarrow CH_3CH_3 + CH_2=CH_2 \qquad (3)$$

while the process of the present invention is believed to proceed according to Equation 4:

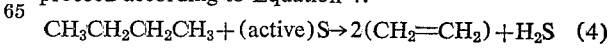
$$CH_3CH_2CH_2CH_3 + (active)S \rightarrow 2(CH_2=CH_2) + H_2S \qquad (4)$$

Thus, more olefinic product is formed due to the combination of the dehydrogenation and cracking mechanism, whereas in thermal pyrolysis only the cracking mechanism is present.

It can now readily be seen that the procedures described herein exemplify a versatile process for preparing a wide variety of olefinic or unsaturated compounds. However, in order to achieve the results of this process, it is essential that the catalyst employed both promotes the desired reaction and inhibits dilatory side reactions. Because of the rather high temperatures involved, there is a marked tendency toward burning of the feed stock to carbon monoxide and/or carbon dioxide. Therefore, it is necessary to employ a catalyst that will inhibit burning and cracking when only dehydrogenation is required and that will inhibit burning at the higher temperatures when cracking is additionally desired. Suitable catalysts, which contain the necessary requisites for conducting this process may be characterized as metal salts which are molten at reaction temperatures. Thus, the only requirements for these molten salts are that they be both molten and stable at the reaction temperatures employed herein. Generally, any salt or salt mixture meeting these requirements may be employed in this invention. One skilled in the art will readily determine the applicable salts or salt mixtures, and their compositions, or may refer to such standard treatises as Levin, Robbins, McMurdies, Phase Diagrams for Ceramists, The American Ceramic Society (1964). However, single metal salts are not generally desirable because of their relatively high melting points and, therefore, salt mixtures, i.e., binary, ternary, quaternary, etc., are preferred. Such salts as the hydroxides, perchlorates, nitrates, nitrites, carbonates, sulfides, sulfates, halides, e.g., fluorides, chlorides, bromides and iodides, and mixtures of the foregoing of any metal or metals selected from Groups I–VIII of the Periodic Chart of the Elements can be employed, within the aforementioned requirements. Additionally, oxides may be employed as promoting salts for the foregoing, but because of their relatively high boiling points are not generally applicable by themselves. Of the foregoing, generally preferred salts are those wherein metallic constituents are selected from Group I–A, I–B, II–A, II–B, III–A, IV, V–A, VII–B, VIII and mixtures thereof. More preferred, however, are salt mixtures wherein the metallic constitutents are selected from Group I, II, and mixtures thereof, still more prefrred are Group I–A, II and mixtures thereof, and most preferred are salt mixtures wherein the metallic constituents are selected from Group I–A, e.g., lithium, sodium, potassium. Additionally, the preferred molten salts may be promoted by the salts, preferably the halides and oxides, of the transition metals of groups IV–B–VIII, e.g., nickel, manganese, titanium, vanadium, etc., in amounts ranging from at least 1 wt. percent of promoter, preferably 1–50 wt. percent, more preferably 5–25 wt. percent promoter based on total salt weight.

Since a wide variety of salts may be employed, the anionic component of the salt is not a critical variable. Nevertheless, the halides, sulfides, and hydroxides are preferred, the halides and sulfides more preferred, and the halides particularly preferred. Of the halides, the chlorides and bromides, particularly the chlorides, are preferred. While the salt mixture may contain different anionic components, it is preferred that the anionic component of the metals be the same in each particular mixture.

Some typical examples of salts and salt mixtures that can be employed in this invention are shown in Table I, following.

TABLE I

| Molten salt mixture | Composition, mole percent | M.P., °F. |
|---|---|---|
| LiCl/KCl | 59/41 | 660 |
| NaCl/CaCl$_2$ | 50/50 | 941 |
| NaCl/MgCl$_2$ | 56/44 | 806 |
| KCl/MgCl$_2$ | 45/55 | 887 |
| ZnCl$_2$/CaCl$_2$ | 80/20 | 842 |
| CdCl$_2$/CaCl$_2$ | 85/15 | 1,013 |
| MgCl$_2$/CaCl$_2$ | 61/39 | 1,150 |
| CaCl$_2$/SnCl$_2$ | 20/80 | 914 |
| NaCl/MnCl$_2$ | 50/50 | 797 |
| Sb$_2$S$_3$/Cu$_2$S | 77/23 | 914 |
| PbS/Cu$_2$S | 49/51 | 1,022 |
| NaCl/KCl/CdCl$_2$ | 30/34/36 | 752 |

Some individual molten salt systems that are most preferred are the LiCl/KCl, NaCl/KCl/CdCl$_2$ systems, either alone or promoted by the salts of manganese and barium. It should be noted that considerable variations in molar proportions for each of the foregoing mixtures can be allowed and are contemplated by this invention. It is only necessary that, regardless of the makeup of the molten salt bath, it be sufficiently fluid and stable at reaction temperatures to allow the reaction to proceed. One skilled in the art will readily determine the optimum conditions for any particular set of reaction conditions. However, a component to be effective should normally be present in amounts in excess of about 1 wt. percent, preferably in excess of about 5 wt. percent, more preferably in excess of about 10 wt. percent, e.g., 20 wt. percent.

The present invention may be conducted over a wide range of operating conditions. However, by adjusting the operating conditions, i.e., temperature and catalyst contact time, the dehydrogenation or the cracking reaction may be maximized while maintaining CO and CO$_2$ formation at a minimum. Thus, the temperature range for carrying out this invention may vary from about 900 to 1600° F. In this range and depending upon the feed stock and catalyst contact time, dehydrogenation will normally be maximized at about 900 to 1250, preferably 1100 to 1250, e.g. 1200° F. Similarly, cracking will be maximized at temperatures ranging from 1100 to 1600° F., preferably 1200 to 1500° F., e.g. 1350° F. In a like manner, catalyst contact time, measured as weight of reactants per weight of catalyst per hour (w./w./hr.), may range from 0.01 to 10 w./w./hr. Shorter contact times will favor dehydrogenation, i.e., higher flow rate, and longer contact times will favor cracking, i.e, lower flow rate. Generally, dehydrogenation is favored by less severe conditions and cracking by more severe conditions. Depending upon temperature and feed, reaction flow rates may preferably range from 0.01 to 1 w./w./hr., more preferably 0.01 to 0.2 w./w./hr., e.g., 0.1 w./w./hr. Pressures are not critical and the reactions may be conducted at pressures ranging from subatmospheric, e.g., 0.1 atmosphere, to about 30 atmospheres, preferably 1–10 atmospheres, e.g., atmospheric pressure. It should be noted, in the context of this application, that maximizing the cracking mechanism does not mean that dehydrogenation is minimized. Dehydrogenation takes place throughout temperature range mentioned.

It will be observed that the temperature ranges shown above for maximizing dehydrogenation and for maximizing cracking overlap to some degree. This factor is, of course, dependent on the relative stability of the feed stock. Generally, the higher the molecular weight of the feed, e.g., paraffins, the lower will be its cracking temperature. Nevertheless, the determination of proper operating conditions within the parameters set forth will be readily achieved by those skilled in the art. Additionally, C$_{6+}$ naphthenes will also tend to dehydrogenate at the lower severities and crack at the higher severities.

The cracking process, as described in the present invention, has significant advantages over thermal or catalytic cracking. Whereas in the latter processes, conversion of the feed to the desired products is limited by thermodynamic equilibrium, the cracking of the feed under oxidative dehydrogenation conditions, a process which may now be called "dehydrocracking," is not equilibrium limited, and can, therefore, go to completion. Thus, any hydrogen formed during cracking, instead of dehydrogenating the olefins already produced, will react with the sulfur or oxygen present in the system to produce highly stable products, i.e., hydrogen sulfide or water. Furthermore, because oxygen is present in the reaction system catalyst coking is not a serious problem as in the case of catalytic or thermal cracking processes which require frequent coke removal cycles for cleaning catalysts or pyrolysis tube walls.

A further advantage of the present invention is that the over-all reaction, i.e., dehydrocracking, is essentially adiabatic. Cracking is an endothermic reaction and requires the input of large amounts of heat whereas oxidative dehydrogenation is a highly exothermic reaction releasing large amounts of heat. A combination of these two processes in a single system can then result in an over-all adiabatic reaction and can eliminate excessive burning of the feed stock, thus allowing a simple reactor system to be used.

Additionally, it is well known that in thermal or catalytic cracking very little dehydrogenation of the feed occurs whereas in the process of this invention, depending upon reaction conditions and feed stock used, considerable dehydrogenation of the feed to more unsaturated products with the same number of carbon atoms occurs. This gives the added advantage of flexibility of operation to optimize the yields of the most valuable olefinic and/or aromatic products.

In the process of this invention, a wide variety of feed stocks may be converted. Generally, dehydrogenation and/or cracking can be effected with any feed stock characterized by having at least one

grouping, i.e., adjacent carbon atoms each having at least one hydrogen atom, which is then dehydrogenated to

Such compounds may contain, in addition to carbon and hydrogen, elements such as halogen, sulfur, and nitrogen. Among the classes of organic compounds that may be dehydrogenated are: alkane, alkenes, cycloalkanes (naphthenes), alkyl aromatics, alkyl halides, cycloalkenes, ethers, esters, aldehydes, ketones, organic acids, alkyl heterocyclics, cyanoalkanes and the like. Illustrative of the conversions that may be effected are: ethylbenzene to styrene, isopropylbenzene to alpha methyl styrene, ethylcyclohexane to styrene, cyclohexane to cyclohexene and benzene, cyclopentane to cyclopentene and/or cyclopentadiene, ethane to ethylene, propane to propylene, butane to butenes and butadiene, methyl butene to isoprene, propionaldehyde to acrolein, ethyl chloride to vinyl chloride, methyl isobutyrate to methyl methacrylate, propionic acid, ethyl pyridine to vinyl pyridine and the like. Preferred compounds are those having 2 to about 30 carbon atoms, more preferably $C_2$–$C_{20}$ hydrocarbons, and still more preferably $C_2$–$C_8$ hydrocarbons. The compounds are preferably aliphatic or contain aliphatic chains for dehydrogenation, e.g., ethylbenzene to styrene. Dehydrogenation has been particularly successful with $C_2$–$C_6$ paraffins, $C_4$–$C_6$ monoolefins, $C_6$–$C_8$ naphthenes, and $C_8$–$C_{10}$ alkyl aromatics.

More specifically, however, by operating under conditions that favor cracking as well as dehydrogenation, suitable feeds such as saturated hydrocarbons or streams containing saturated hydrocarbons may be employed advantageously. The feed may be any single hydrocarbon which can be vaporized at the reaction temperature, preferably $C_3$–$C_{30}$ hydrocarbons, or mixtures thereof, as well as more complex feed streams such as naphtha cuts, e.g., 140/310° F. or 140/220° F., reformates from the reforming process, catalytically or steam cracked naphthas, gas oils, waxy distillates, etc.

Of the above feeds, most of which are normally obtained by the fractionation of crude petroleum, the preferred feeds are those which allow the production of valuable light olefins, e.g., ethylene, and aromatics, e.g., benzene. Thus, feed stocks such as naphthas and gas oils are particularly preferred.

While Equations 1 and 2, above, indicate that the theoretical quantity of active sulfur required to dehydrogenate one mole of feed stock necessitates the use of one mole of hydrogen sulfide and one-half mole of oxygen, it has been found that effective results for both dehydrogenation and cracking may be obtained with molar ratios that vary relatively widely, as shown in Table II.

TABLE II

| | Effective | Broad | Preferred | More preferred |
|---|---|---|---|---|
| $H_2S$/Feed | At least 0.1 | 0.1–10 | 0.2–4 | 1–4 |
| $O_2$/Feed | do | 0.1–5 | 0.1–2 | 0.5–2 |

Regardless of the molar ratios employed, it is still more preferable that the molar relationship of hydrogen sulfide to oxygen be no less than about 0.67/1 and is preferably 2/1. This will prevent the formation of sulfur dioxide, which, although a strong oxidizing agent, results in lowered yields and is not preferred.

The process of this invention, with regard to cracking, is easily distinguished from the cracking of residual feeds which have not been desulfurized or which still contain sulfur. Thus, such feeds do not contain sulfur in the amounts which are necessary to produce the results shown herein. Residual sulfur content is usually about 0.1–5%, which is well below that normally required for this process.

While not essential to the reaction, it is preferred to employ an inert diluent in order to facilitate the introduction and removal of reactants and products to and from the molten media. The inert diluent should normally be employed in an amount of at least one mole per mole of organic feed and preferably in a molar ratio of from about 1 to about 20 based on feed, and more preferably 1 to 10. Illustrative of the diluents that may be employed are: helium, carbon dioxide, nitrogen, steam, methane, waste gases containing methane and small quantities of other hydrocarbons, argon, and the like.

In a typical embodiment of this invention, and one which clearly illustrates the effectiveness of this process as a dehydrogenation and cracking process, a light naphtha is processed in order to crack and dehydrogenate paraffins to light olefins and dehydrogenate the naphthenes to aromatics. The liquid feed, $H_2S$, $O_2$ and a nitrogen diluent, in the molar ratios as previously defined, are metered through separate flow meters, mixed and fed into the bottom of a stainless steel reactor. The reactants are bubbled through a molten bed of lithium chloride and potassium chloride (59/41 molar ratio) of a 660° F. eutectic. After reaction at the desired temperature, the effluent is passed through a water cooled condenser and liquid product is separated. This liquid product contains all of the aromatics in the original feed together with those produced in dehydrogenating the naphthenes in the feed. Because all of the paraffins (plus some of the naphthenes) in the feed are cracked to light $C_2$–$C_4$ olefins (plus some methane and $CO_2$), the liquid product is essentially 100% aromatics. As such, it can be used directly as a high octane concentrate for gasoline blending or it can be subjected to fractionation for the production of individual pure aromatics, e.g., benzene, toluene and xylenes. In the latter case, the need for an expensive liquid-liquid extract step to separate pure aromatics from an aromatic/paraffin mixture is eliminated.

The off-gas from the liquid product, containing the light olefins, $H_2S$ and inert (nitrogen) diluent (plus methane, some heavier paraffins and $CO_2$), is treated to separate $H_2S$ and $CO_2$ which is then recycled to the reactor. The hydrocarbon-diluent mixture is then treated by conventional means to separate the light $C_2$–$C_4$ olefins from each other as well as from the nitrogen diluent and light paraffins. The latter may be recycled to the process.

At this point it should be emphasized that any convenient processing scheme can be used to separate the hydrocarbons in the reactor effluent from each other and from the $H_2S$ and inert diluent used. The exact processing steps will, of course, depend upon the feed stocks used and the nature of the effluent produced. The example described is offered only as an illustration of the process scheme of this invention.

In another embodiment of this invention, it has been found that the yield of light olefins from the cracking of hydrocarbons can be increased by the addition of small amounts of a hydrogen halide, i.e., chloride, iodide, bromide, to the reaction mixture. While no full explanation of this result is available, it is believed that the greater acidity of the molten media due to the addition of the halides leads to the increased production of intermediates, e.g., carbonium ions, which facilitate the cracking reaction. The hydrogen halide, preferably the chloride, is added in molar amounts, based on organic feed of about 0.001 to 10, preferably 0.1 to 2.

Several examples were conducted to prove the efficacy of the hydrogen sulfide promoted oxidative dehydrogenation and for cracking in molten media. These examples were carried out in heavy gauge stainless steel melt pot type reactors having an inner diameter of about one inch and a length of about 14 inches. The feed gases or liquids and diluent were fed from separate containers and measured by flowmeters. The gases were then premixed and introduced through a single inlet tube to the bottom of the melt. The reactor is preferably packed with stainless steel mesh or porcelain beads to break up gas bubbles and improve the contact between reactants and melt. The reactor was heated in a 12-inch electric tube furnace controlled by a temperature controller. The melt temperature was measured by a thermocouple inserted into a thermowell positioned in the center of the molten media and connected to a portable pyrometer. The effluent gases were cooled in a water condenser. Noncondensable gases were either passed directly to a gas chromatograph for analysis or collected in a plastic balloon. Gas density and balloon volume could be measured and the gas analyzed for a complete weight and material balance. The following tables show the results of these runs. However, no limitations are to be implied by these illustrations since variations and modifications will be obvious to those skilled in the art.

TABLE III.—DEHYDROGENATION OF BUTANE IN MOLTEN MEDIA 100 g. melt in reactor:
Temp.=1,150° F.
$C_4$ flow rate=0.1 w./w./hr.
$C_4/H_2S/O_2/He=1/2/1/3.4$

| Molten Media | Chlorides | | | | | | | Sulfides | | |
| --- | --- | --- | --- | --- | --- | --- | --- | --- | --- | --- |
| | Li/K | Na/Ca | Ca/Cd | Ca/Mg | Na/Mg | K/Mg | Na/Mn | Sb | Sb/Cu | Pb/Cu |
| $C_4$ Conversion, percent | 63.3 | 68.6 | 90.3 | 92.8 | 98.7 | 90.6 | 76.0 | 90.4 | 93.8 | 93.0 |
| Wt. percent selectivity: | | | | | | | | | | |
| To butenes | 29.7 | 20.6 | 7.6 | 5.1 | 4.9 | 12.9 | 17.5 | 7.9 | 7.4 | 7.3 |
| To Butadiene | 29.1 | 25.7 | 6.9 | 6.7 | 19.4 | 22.8 | 17.9 | 6.3 | 5.5 | 3.1 |
| Total | 58.8 | 46.3 | 14.5 | 11.8 | 24.3 | 35.7 | 35.4 | 14.2 | 12.9 | 10.4 |
| Wt. percent yield: | | | | | | | | | | |
| Butenes | 18.8 | 14.1 | 6.9 | 4.7 | 4.8 | 11.7 | 13.3 | 7.1 | 6.9 | 6.8 |
| Butadiene | 18.4 | 17.6 | 6.2 | 6.2 | 19.1 | 20.7 | 13.6 | 5.7 | 5.2 | 2.9 |
| Total $C_4$ olefins | 37.2 | 31.7 | 13.1 | 10.9 | 23.9 | 32.4 | 26.9 | 12.8 | 12.1 | 9.7 |
| $C_4^=/C_4^-$ product | 1.0 | 1.3 | 0.9 | 1.3 | 4.0 | 1.8 | 1.0 | 0.8 | 0.8 | 0.4 |

Table III, above, shows some initial screening results for sulfide and chloride salts. The data indicates that chlorides are generally preferable to sulfides in this invention. This data, illustrative of binary mixtures, indicates that mixtures containing at least one alkali metal salt are preferred.

TABLE IV.—DEHYDROGENATION OF n-BUTANE IN THREE-COMPONENT MELTS

Temp.=1,200° F.
$C_4$ space velocity=0.1 w./w./hr.
$C_4/H_2S/O_2/He=1/2/1/3.6$

| Molten Media | NaCl/KCl/CdCl$_2$ | 59 mole percent LiCl-41 mole percent KCl containing 20 wt. percent | | | | | | |
| --- | --- | --- | --- | --- | --- | --- | --- | --- |
| | | NiCl$_2$ | TiO$_2$ | CdCl$_2$ | CaCl$_2$ | Ti$_2$O$_3$ | BaCl$_2$ | MnCl$_2$ |
| $C_4$ Conversion, percent | 82.8 | 93.3 | 94.0 | 97.0 | 94.9 | 54.1 | 75.5 | 82.2 | 81.4 |
| Wt. percent selectivity: | | | | | | | | | |
| Butenes | 17.4 | 9.4 | 8.4 | 8.0 | 9.2 | 18.1 | 17.6 | 12.2 | 17.3 |
| Butadiene | 30.7 | 24.1 | 22.8 | 24.6 | 28.2 | 47.5 | 34.0 | 36.6 | 37.1 |
| Total | 48.1 | 33.3 | 31.2 | 32.6 | 37.4 | 65.6 | 51.6 | 48.8 | 54.4 |
| Wt. percent yield: | | | | | | | | | |
| Butenes | 14.4 | 8.9 | 7.9 | 7.8 | 8.7 | 9.8 | 13.3 | 10.0 | 14.1 |
| Butadiene | 25.4 | 22.5 | 21.4 | 23.9 | 26.7 | 25.7 | 25.7 | 30.0 | 30.2 |
| Total | 39.9 | 31.4 | 29.3 | 31.7 | 35.4 | 35.5 | 39.0 | 40.0 | 44.3 |
| $C_4^=/C_4^-$ in Product | 1.8 | 2.5 | 2.7 | 3.1 | 3.1 | 2.6 | 1.9 | 3.0 | 2.1 |

The data shown above, for ternary mixtures, indicates that the NaCl/KCl/CdCl$_2$ and LiCl/KCl mixtures promoted with barium or manganese chlorides or thallium oxide are advantageous.

TABLE V.—EFFECT OF INCREASING H$_2$S AND O$_2$ ON C$_4$ OLEFIN YIELDS

Feed=n-Butane
Catalyst=NaCl/KCl/CdCl$_2$
Temperature=1,200° F.
Diluent=He

| $C_4$ sp. vel., w./w./hr. | Moles/mole $C_4$ | | | $C_4$ conv. percent | Selectivities, wt. percent | | | Yields, wt. percent | | | $C_4^=/C_4^-$ in prod |
| --- | --- | --- | --- | --- | --- | --- | --- | --- | --- | --- | --- |
| | H$_2$S | O$_2$ | He | | $C_4^=$ | $C_4^-$ | T | $C_4^=$ | $C_4^-$ | T | |
| 0.08 | 2 | 1 | 3.6 | 82.8 | 17.4 | 30.7 | 48.1 | 14.4 | 25.4 | 39.9 | 1.8 |
| 0.08 | 4 | 2 | 7.1 | 87.5 | 8.1 | 44.2 | 52.3 | 7.1 | 38.6 | 45.7 | 5.5 |
| 0.06 | 5 | 2.5 | 8.9 | 96.4 | 6.1 | 36.6 | 42.7 | 5.9 | 35.2 | 41.1 | 6.0 |
| 0.05 | 6 | 3 | 10.2 | 94.7 | | 34.4 | 34.4 | | 32.6 | 32.6 | |

Table V, above, indicates that increasing amounts of hydrogen sulfide and oxygen relative to the feed, while maintaining a 2/1 relationship between the H$_2$S and O$_2$, results in maximum yields to unsaturated products when the H$_2$S and O$_2$ are employed at twice the stoichiometric requirement for dehydrogenating one mole of feed. Also, increasing use of $H_2S$ and $O_2$ tends to increase the ratio of butadiene to butene in the unsaturated product.

employ ethane, ethyl benzene, and butene feeds with a preferred catalyst system.

TABLE VI.—EFFECT OF INCREASING $H_2S$ AND $O_2$ CONTENT ON OLEFIN YIELDS

Feed=n-Butane
Temperature=1,200° F.
$C_4$ sp. vel.=0.1 w./w./hr.

| Reaction media LiCl/KCl containing | Ni | | Mn | | Ti | | Ca | | Ba | | Ti | |
|---|---|---|---|---|---|---|---|---|---|---|---|---|
| $H_2S/O_2/C_4$ | 2/1/1 | 4/2/1 | 2/1/1 | 4/2/1 | 2/1/1 | 4/2/1 | 2/1/1 | 4/2/1 | 2/1/1 | 4/2/1 | 2/1/1 | 4/2/1 |
| $C_4$ conv., percent | 93.3 | 99.0 | 94.0 | 92.5 | 81.4 | 80.9 | 75.5 | 90.6 | 54.1 | 75.9 | 82.2 | 83.8 | 97.0 | 84.4 |
| Selectivity, wt. percent: | | | | | | | | | | | | |
| Butenes | 9.4 | 2.0 | 8.4 | 8.3 | 17.3 | 5.7 | 17.6 | 2.5 | 18.1 | 4.2 | 12.2 | 6.2 | 8.0 | 2.5 |
| Butadiene | 24.1 | 32.0 | 22.8 | 33.5 | 37.1 | 59.6 | 34.0 | 41.3 | 47.5 | 51.8 | 36.6 | 54.5 | 24.6 | 46.0 |
| Total | 33.5 | 34.0 | 31.2 | 41.8 | 54.4 | 65.3 | 51.6 | 43.8 | 65.6 | 56.0 | 48.8 | 60.7 | 32.6 | 48.5 |
| Yields, wt. percent: | | | | | | | | | | | | |
| Butenes | 8.9 | 2.0 | 7.9 | 7.8 | 14.1 | 4.6 | 13.3 | 2.3 | 9.8 | 3.2 | 10.0 | 5.2 | 7.8 | 2.1 |
| Butadiene | 22.5 | 31.7 | 21.4 | 31.0 | 30.2 | 48.3 | 25.7 | 37.4 | 25.7 | 39.3 | 30.0 | 45.8 | 23.9 | 38.8 |
| Total | 31.4 | 33.7 | 29.3 | 38.8 | 44.3 | 52.9 | 39.0 | 39.7 | 35.5 | 42.3 | 40.0 | 51.0 | 31.7 | 40.9 |
| $C_4^-C_4^=$ in product | 2.5 | 15.9 | 2.7 | 4.0 | 2.1 | 10.5 | 1.9 | 16.0 | 2.6 | 12.3 | 3.0 | 8.8 | 3.1 | 18.5 |

Table VI shows the effect of using stoichiometric and twice stoichiometric relationships of $H_2S$ and $O_2$ for the dehydrogenation of butane in various molten salt baths. The data presented indicates that the total yield of unsaturated products as well as the ratio of butadiene to butene increases when twice the stoichiometric amount of $H_2S$ and $O_2$ are employed for dehydrogenation of one mole of feed. Also, the best yields are obtained with manganese and barium promoted mixtures.

TABLE VII.—EFFECT OF STEAM DILUENT ON THE DEHYDROGENATION OF BUTENE

Feed=Butene-1
Catalyst=Li/K/Mn chlorides
Temperature=1,200° F.
$C_4^=/H_2S/O_2$ mole ratio=1/1/1

| $C_4^=$ sp. vel., w./w./hr. | Diluent, moles/mole $C_4^=$ | | $C_4^=$ Conversion, percent | $C_4^=$ Selectivity, percent | $C_4^=$ Yield percent |
|---|---|---|---|---|---|
| | He | $H_2O$ | | | |
| 0.04 | 10 | | 91 | 85 | 77 |
| 0.04 | 3.6 | 6.4 | 63 | 80 | 50 |
| 0.025 | 3.6 | 6.4 | 88 | 78 | 68 |

This table shows that replacment of helium diluent with steam tends to lower both conversion and selectivity. However, increasing severity by, for example, lowering space velocity increases the conversion to almost its former level.

The following tables, VIII–X, further illustrate dehydrogenation reactions and show the effect of varying temperature and molar ratio of $H_2S$ and $O_2$ to feed, which

TABLE VIII.—ETHYLENE FROM ETHANE USING A MOLTEN BED CATALYST

Catalyst: 5% $MnCl_2$ in molten LiCl/KCl
Temperature=1,300° F.
Ethane sp. vel.=0.04 w./w./hr.

| Moles/mole ethane | | | Ethane conv., percent | Ethylene, percent | Ethylene yield, percent |
|---|---|---|---|---|---|
| $H_2S$ | $O_2$ | He | | | |
| | | 6.6 | 20 | 96 | 19 |
| | 1 | 3.6 | 51 | 89 | 45 |
| 2 | 1 | 3.6 | 81 | 89 | 72 |
| 2 | 1 | 10 | 86 | 87 | 75 |

This table illustrates the high yields of ethylene that may be obtained by utilizing the present process.

TABLE IX.—CONVERSION OF ETHYLBENZENE TO STYRENE

Media: LiCl/KCl/$MnCl_2$

| Temp., ° F. | EB sp. vel., w./w./hr. | Reactant, mole ratios | | | | EB conv., percent | Styrene sel., percent | Styrene yield, percent |
|---|---|---|---|---|---|---|---|---|
| | | EB | $H_2S$ | $O_2$ | He | | | |
| 1,200 | 0.14 | 1 | 2 | 1 | 10 | 94.0 | 76.9 | 72.3 |
| 1,300 | 0.10 | 1 | 1 | 1 | 10 | 84.3 | 74.6 | 62.9 |
| 1,325 | 0.28 | 1 | 1 | 1 | 10 | 97.3 | 67.5 | 65.7 |
| 1,325 | 0.28 | 1 | 2 | 1 | 10 | 97.6 | 67.7 | 66.1 |
| 1,200 | 0.07 | 1 | 1 | 1 | 10 | 87.1 | 85.4 | 74.4 |
| 1,200 | 0.07 | 1 | 1 | 1 | 4 | 81.9 | 83.3 | 68.2 |

TABLE X.—BUTADIENE FROM BUTENE

Catalyst: 5% $MnCl_2$ in molten LiCl/KCl
$C_4^=/O_2$/He=1/1/10

| Temp., ° F. | Space velocity, w./w./hr. | Mole ratio $H_2S/C_4^=$ | Butene conv., percent | Sel. to butadiene, percent | Butadiene yield, percent |
|---|---|---|---|---|---|
| 1,300 | 0.09 | 2 | 96 | 88 | 84 |
| 1,300 | 0.04 | 1 | 98 | 70 | 69 |
| 1,200 | 0.04 | 1 | 92 | 82 | 76 |
| 1,200 | 0.04 | 1 | 91 | 85 | 77 |
| 1,200 | 0.08 | 2 | 90 | 91 | 82 |

The following data illustrate the utilization of this invention in the dehydrocracking of saturated feed streams.

TABLE XI.—LIGHT OLEFINS FROM GASEOUS N-PARAFFINS $HC/H_2S/O_2$ mole ratio=1/2/1
2-10 moles helium diluent

| Catalyst | Temp., ° F. | Feed conv., percent | Wt. percent selectivity to— | | | | Wt. percent yield of— | | | |
|---|---|---|---|---|---|---|---|---|---|---|
| | | | $C_4^=$ | $C_4^-$ | $C_3^=$ | $C_2^=$ | $C_4^=$ | $C_4^-$ | $C_3^=$ | $C_2^=$ |
| Ethane: LiCl/KCl+5% $MnCl_2$ | 1,300 | 86 | | | | 87 | | | | 75 |
| Propane: | | | | | | | | | | |
| LiCl/KCl | 1,200 | 68 | | | 77 | 11 | | | 53 | 8 |
| LiCl/KCl | 1,300 | 94 | | | 64 | 22 | | | 60 | 20 |
| LiCl/KCl | 1,300 | 100 | | | 27 | 38 | | | 27 | 38 |
| Butane: | | | | | | | | | | |
| LiCl/KCl | 1,200 | 91 | 53 | 6 | 14 | 12 | 48 | 5 | 13 | 11 |
| LiCl KCl | 1,150 | 63 | 29 | 30 | 19 | 8 | 18 | 19 | 12 | 5 |
| $CaCl_2$/$MgCl_2$ | 1,150 | 93 | 6 | 5 | 10 | 15 | 6 | 5 | 18 | 14 |

The data presented in Table XI above and Table XII following illustrate the cracking and dehydrogenation of paraffin feed stocks. It would normally be expected that a considerable amount of burning of the feed stock would be encountered under these conditions. However, instead of burning a high selectivity to light olefins, i.e., $C_2$-$C_4$ olefins, is obtained.

430%. Simultaneously high yields of $C_2$-$C_4$ olefins were obtained.

In order to investigate the dehydrogenation and cracking mechanisms, a synthetic naphtha was prepared comprising 50 vol. percent n-heptane and 50 vol. percent cyclohexane. The results of processing this feed are shown in Tables XV and XVI.

TABLE XII.—PROPANE DEHYDROGENATION AND CRACKING

Molten Media: LiCl/KCl/MnCl$_2$

| Temp. | $C_3$ sp. vel., w./w./hr. | Feed mole ratio | | | | $C_3$ conv., percent | Percent Selectivity to— | | | Yields, Wt. percent on carbon in feed | | |
|---|---|---|---|---|---|---|---|---|---|---|---|---|
| | | $C_3$ | $H_2S$ | $O_2$ | He | | $C_3{-}$ | $C_2{-}$ | Total | $C_3{-}$ | $C_2{-}$ | Total |
| 1,200 | 0.1 | 1 | 2 | 1 | 3.6 | 76 | 68 | 16 | 84 | 52 | 12 | 64 |
| 1,300 | 0.1 | 1 | 2 | 1 | 3.6 | 97 | 48 | 28 | 76 | 46 | 27 | 73 |
| 1,200 | 0.1 | 1 | 2 | 1 | 10 | 68 | 77 | 11 | 88 | 53 | 8 | 61 |
| 1,300 | 0.1 | 1 | 2 | 1 | 10 | 94 | 64 | 22 | 86 | 60 | 20 | 80 |
| 1,300 | 0.04 | 1 | 2 | 1 | 3.6 | 100 | 43 | 28 | 71 | 43 | 28 | 71 |

Molten Media: LiCl/KCl

| 1,200 | 0.1 | 1 | 2 | 1 | 3.6 | 67 | 71 | 14 | 85 | 47 | 9 | 56 |
|---|---|---|---|---|---|---|---|---|---|---|---|---|
| 1,300 | 0.1 | 1 | 2 | 1 | 3.6 | 97 | 58 | 21 | 79 | 56 | 21 | 77 |
| 1,300 | 0.1 | 1 | 1 | 0.5 | 1.8 | 97 | 53 | 28 | 81 | 51 | 27 | 78 |
| 1,300 | 0.1 | 1 | 1 | 0.5 | 10 | 70 | 67 | 22 | 89 | 47 | 15 | 62 |
| 1,300 | 0.1 | 1 | 2 | 1 | 10 | 86 | 67 | 19 | 86 | 58 | 16 | 74 |
| 1,300 | 0.04 | 1 | 1 | 0.5 | 1.8 | 100 | 27 | 38 | 65 | 27 | 38 | 65 |
| 1,300 | 0.04 | 1 | 2 | 1 | 3.6 | 100 | 43 | 25 | 68 | 43 | 25 | 67 |
| 1,300 | 0.04 | 1 | 2 | 1 | 10 | 95 | 65 | 20 | 85 | 62 | 19 | 81 |

Tables XIII and XIV illustrate the process of this invention as used to treat naphtha feeds.

TABLE XIII.—INSPECTION ON 140/220° F. NAPHTHA

| C No. | Gas chromatographic analysis, wt. percent | | |
|---|---|---|---|
| | Paraffin | Naphthenes | Aromatics |
| $C_5$ | 1.0 | 0.3 | |
| $C_6$ | 25.8 | 16.5 | 2.8 |
| $C_7$ | 19.0 | 21.7 | 4.4 |
| $C_8$ | 3.6 | 5.1 | |
| | 49.4 | 43.6 | 7.2 |

Gravity API°=63.8 (S.G. 60/60=0.725 g./cc.).

Mass spec. analysis, vol. percent:
Naphthenes _____ 40.0
Paraffins _____ 52.4
Aromatics _____ 7.6
                              100.0
Molecular weight _____ 92.8

TABLE XIV.—PRODUCT YIELD IN PROCESSING A 140/220° F. NAPHTHA

Naphtha/$H_2S$/$O_2$=1/2/1
Catalyst=LiCl/KCl

| | A | B | C | D |
|---|---|---|---|---|
| Naphtha sp. vel., w./w./hr | 0.23 | 0.12 | 0.23 | 0.12 |
| Temperature, °F | 1,150 | 1,150 | 1,050 | 1,050 |
| He/naphtha in feed | 3.8 | 5.8 | 3.8 | 3.8 |
| Product yield, wt. percent: | | | | |
| Unconverted feed (ex. aromatics) | 3.9 | 8.8 | 27.0 | 25.8 |
| $C_1$+ carbon in CO+$CO_2$ | 14.3 | 10.4 | 6.9 | 7.5 |
| $C_2$, $C_3$, $C_4$ paraffin | 8.6 | 7.2 | 4.9 | 5.7 |
| Ethylene | 11.4 | 7.2 | 4.5 | 3.8 |
| Propylene | 17.4 | 12.8 | 8.5 | 7.7 |
| Butylenes | 12.9 | 6.4 | 4.0 | 3.8 |
| Butadiene | 4.1 | 3.2 | 1.1 | 1.1 |
| $C_5$+ olefins | | 3.2 | 7.7 | 10.2 |
| Aromatics (incl. feed aromatics) | 30.2 | 37.4 | 31.6 | 31.4 |
| Naphthene conv., percent | 97.0 | 92.8 | 77.6 | 78.5 |
| Naphthene selectivity to aromatics | 53.9 | 76.5 | 71.7 | 70.2 |
| Aromatic yield on naphthenes, percent | 52.2 | 71.0 | 55.6 | 55.0 |
| Yields on naphtha not going to aromatics (wt. percent): | | | | |
| Ethylene | 15.3 | 11.7 | 7.4 | 6.1 |
| Propylene | 23.4 | 20.7 | 14.0 | 12.4 |
| Butylene | 17.3 | 10.4 | 6.6 | 6.1 |
| Butadiene | 5.5 | 5.2 | 1.8 | 1.8 |
| | 61.5 | 48.0 | 29.8 | 26.4 |

It should be noted in Table XIV that the aromatic content increased from 7.2% to at least 30.2% and up to 37.4%. These increases are in the magnitude of 330–

TABLE XV.—PRODUCT YIELD FROM PROCESSING A n-$C_7$ CYCLOHEXANE FEED

Feed=50 vol. percent n-$C_7$, 50 vol. percent $CyC_6$
Catalyst=LiCl/KCl
HC sp. vel., w./w./hr.=0.3
HC/$H_2S$/$O_2$/He=1/2/1/3.8

| Temperature, °F | 1,050 | 1,200 | 1,275 |
|---|---|---|---|
| Product yields wt. percent on HC feed: | | | |
| Unconverted feed | 38.5 | 5.0 | 2.2 |
| $C_1$+C in CO+$CO_2$ | 4.7 | 13.3 | 13.9 |
| $C_2$, $C_3$, $C_4$ paraffins | 2.0 | 10.2 | 8.8 |
| Ethylene | 3.4 | 18.7 | 17.0 |
| Propylene | 5.2 | 16.1 | 14.6 |
| Butylene | 2.7 | 5.0 | 5.5 |
| Butadiene | 1.4 | 6.6 | 8.2 |
| $C_5$+ olefins | 11.8 | | |
| Aromatics | 25.5 | 22.8 | 27.8 |
| Naphthene ($CyC_6$) conv., percent | 73.6 | 96.8 | 98.5 |
| Selectivity to aromatics | 64.8 | 43.2 | 52.8 |
| Aromatic yield on naphthenes, percent | 47.7 | 42.7 | 52.0 |
| Yields on hydrocarbon not going to aromatics (wt. percent): | | | |
| Ethylene | 6.2 | 24.8 | 23.9 |
| Propylene | 9.4 | 21.4 | 20.6 |
| Butylene | 4.9 | 6.6 | 7.7 |
| Butadiene | 2.5 | 8.8 | 11.5 |
| | 23.0 | 61.6 | 63.7 |

TABLE XVI.—PRODUCT YIELDS FROM PROCESSING PURE $C_6$ AND $C_7$ HYDROCARBONS

Catalyst=LiCl/KCl
He sp. vel., w./w./hr.=0.3
Temperature=1,200° F.
HC/$H_2S$/$O_2$/He=1/2/1/3.8

| HC feed | n-$C_6$ | n-$C_7$ | MCH [1] |
|---|---|---|---|
| Product yields, wt. percent on HC feed: | | | |
| Unconverted feed | 10.9 | 9.3 | 13.0 |
| $C_1$+C in CO+$CO_2$ | 12.5 | 10.9 | 8.7 |
| $C_2$, $C_3$, $C_4$ paraffin | 10.6 | 9.8 | 1.8 |
| Ethylene | 13.2 | 12.6 | 2.6 |
| Propylene | 21.3 | 20.2 | 4.3 |
| Butylene | 12.1 | 11.5 | 2.6 |
| Butadiene | 5.7 | 5.5 | 2.6 |
| $C_5$+ olefins | 3.4 | 1.6 | 3.5 |
| Aromatics | 11.5 | 18.6 | 60.9 |
| Feed conversion, percent | 89.1 | 90.7 | 87.0 |
| Selectivity to aromatics | 12.9 | 21.5 | 70.0 |
| Aromatic yield, percent | 11.5 | 18.6 | 60.9 |
| Yields on feed not going to aromatics (wt. percent): | | | |
| Ethylene | 15.2 | 15.8 | 8.7 |
| Propylene | 24.5 | 25.4 | 14.3 |
| Butylene | 13.9 | 14.5 | 8.7 |
| Butadiene | 6.5 | 6.9 | 8.7 |
| | 60.1 | 62.6 | 40.4 |

[1] Methylcyclohexane.

Table XVII illustrates the increased yields of light olefins when a hydrogen halide is added to the reactants introduced to the reactor. It can be seen that the ethylene and propylene yields are increased by 100–200% using a hydrogen halide.

TABLE XVII.—DEHYDROCRACKING n-BUTANE

Catalyst=100 g. LiCl/KCl
Temperature=1,100° F.
$C_4$ sp. vel., w./w./hr.=0.07

| | | | | |
|---|---|---|---|---|
| $O_2/C_4$ | 1 | 1 | 1.5 | 1.5 |
| $H_2S/C_4$ | 2 | 2 | 2 | 2 |
| $HC/C_4$ | 3.9 | 3.9 | 5.8 | 5.8 |
| $HCl/C_4$ | 0 | 1 | 0 | 1 |
| Product yields, wt. percent C on feed: | | | | |
| CO, $C_1$ | 6.3 | 14.5 | 7.3 | 17.6 |
| $C_2, C_2^{=1}$ | 4.7 | 12.3 | 8.7 | 15.3 |
| $CO_2$ | 1.1 | 0.6 | 1.5 | 0.8 |
| $C_3^=$ | 7.4 | 15.1 | 6.6 | 19.1 |
| n-$C_4$ | 47.9 | 39.1 | 45.3 | 29.8 |
| $C_4^=$ | 16.8 | 14.5 | 16.8 | 11.5 |
| $C_4^=$ | 15.8 | 3.9 | 13.9 | 6.1 |
| n-$C_4$ conversion, percent | 52.1 | 60.9 | 54.7 | 70.2 |
| Yield of olefins from dehydrogenation, percent | 32.6 | 18.4 | 30.7 | 17.6 |
| Yield of olefins from dehydrocracking, percent | 12.1 | 27.4 | 15.3 | 34.4 |
| Yield of Total Olefins, percent | 44.7 | 45.8 | 46.0 | 52.0 |

¹ Principally $C_2^=$.

What is claimed is:

1. A process for preparing unsaturated organic compounds which comprises reacting, in the vapor phase, an organic compound having at least one

grouping, hydrogen sulfide, and oxygen at a temperature of at least about 900° F., the reaction being conducted in a stable molten salt medium.

2. The process of claim 1 wherein the temperature ranges from about 900–1600° F.

3. The process of claim 1 wherein an inert diluent is employed in an amount of at least about 1 mole per mole of organic feed.

4. The process of claim 1 wherein the molar ratio of $H_2S$ to organic feed is at least 0.1/1 and the molar ratio of $O_2$ to organic feed is at least about 0.1/1.

5. The process of claim 4 wherein the molar ratio of $H_2S$ to $O_2$ is no less than about 0.67/1.

6. The process of claim 4 wherein the molten salt medium is a mixture of at least two salts selected from the group consisting of halides, sulfides, and hydroxides of Group I, II, III–A, IV, V–A, VII–B, VIII metals.

7. The process of claim 6 wherein the molten salt is a halide mixture.

8. The process of claim 7 wherein the metallic constituent of the salt are selected from Group I, II, and mixtures thereof.

9. A process for preparing unsaturated hydrocarbons which comprises reacting, in the vapor phase, a $C_2$–$C_{30}$ hydrocarbon having at least one

grouping at least about 0.1 mole $H_2S$ per mole of hydrocarbon, and at least about 0.1 mole of oxygen per mole of hydrocarbon at a temperature ranging from about 900°–1600° F., the reaction being effected in a molten salt medium which comprises a mixture of at least two salts selected from the group consisting of halides and sulfides of Group I, II, III–A, IV, V–A, VII–B, and VIII metals.

10. The process of claim 9 wherein an inlet diluent is employed in amounts ranging from about 1–20 moles per mole of hydrocarbon.

11. The process of claim 9 wherein the molar ratio of $H_2S$ to hydrocarbon is about 0.1–10, the molar ratio of $O_2$ to hydrocarbon is about 0.1–5, and the molar ratio of $H_2S$ to $O_2$ is not less than about 0.67/1.

12. The process of claim 11 wherein the molar ratio of $H_2S$ to hydrocarbon is about 0.2–4 and the molar ratio of $O_2$ to hydrocarbon is about 0.1–2.

13. The process of claim 11 wherein the molar ratio of $H_2S$ to hydrocarbon and $O_2$ to hydrocarbon is about twice the stoichiometric requirement for dehydrogenating one mole of feed hydrocarbon.

14. The process of claim 11 wherein the molten salt medium comprises halides.

15. The process of claim 14 wherein the metallic constituents of the molten salt are selected from Group I, II, and mixtures thereof.

16. The process of claim 15 wherein the molten salt is promoted by salts selected from the group consisting of halides and oxides of nickel, manganese, barium, titanium, and thallium.

17. The process of claim 14 wherein the metallic constituents of the molten salt are selected from Group I–A.

18. The process of claim 14 wherein the molten salt is comprised of LiCl and KCl.

19. The process of claim 14 wherein the molten salt is comprised of NaCl and KCl and $CdCl_2$.

20. The process of claim 11 wherein the reaction is effected at temperatures of about 900° F.–1250° F. and the hydrocarbon feed is essentially dehydrogenated.

21. The process of claim 20 wherein the feedstock is selected from the group consisting of $C_2$–$C_6$ paraffins, $C_4$–$C_6$ mono-olefins, $C_6$–$C_8$ naphthenes, and $C_8$–$C_{10}$ alkyl aromatics.

22. The process of claim 11 wherein the reaction is effected at temperatures of about 1100–1600° F., and the hydrocarbon feed is dehydrogenated and cracked.

23. The process of claim 22 wherein the feed is comprised of saturated hydrocarbons.

24. The process of claim 22 wherein the feed is a naphtha.

25. The process of claim 22 wherein the feed is a gas oil.

26. A process for preparing light olefins and aromatics which comprises reacting a feed comprised of $C_2$–$C_{30}$ saturated hydrocarbons with $H_2S$, the molar ratio of $H_2S$ to feed being about 0.2 to 4, and $O_2$, the molar ratio of $O_2$ to feed being about 0.1–2 at temperatures ranging from about 1100° to 1600° F. in the presence of an amount of an inert diluent of at least one mole per mole of feed, the reaction being effected in a molten salt medium comprising at least two halides of metals selected from Group I, II, and mixtures thereof.

27. The process of claim 26 wherein the halides are chlorides.

28. The process of claim 26 wherein the metals are selected from Groups I–A and II–A.

29. The process of claim 26 wherein a hydrogen halide is added to the reaction mixture.

30. The process of claim 26 wherein light olefins are prepared.

31. The process of claim 26 wherein aromatics are prepared.

References Cited

UNITED STATES PATENTS

| | | | |
|---|---|---|---|
| 3,168,584 | 2/1965 | Nager | 260—680 XR |
| 3,336,413 | 8/1967 | Benson et al. | 260—680 |
| 3,373,213 | 3/1968 | Pasternak et al. | 260—669 |

DELBERT E. GANTZ, *Primary Examiner.*

CURTIS R. DAVIS, *Assistant Examiner.*

U.S. Cl. X.R.

260—666, 673, 680, 683.3